Figure 1:
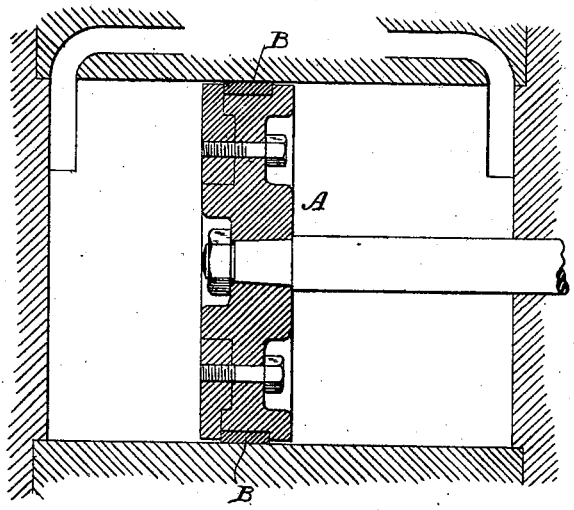

(No Model.)

L. PERKINS.
WEARING SURFACE OF STEAM ENGINES.

No. 244,292. Patented July 12, 1881.

WITNESSES
Wm A. Skinkle
Jos. S. Latimer

By his Attorneys
Baldwin, Hopkins & Peyton

INVENTOR
Loftus Perkins

N. PETERS. Photo-Lithographer. Washington. D. C.

UNITED STATES PATENT OFFICE.

LOFTUS PERKINS, OF SEAFORD STREET, COUNTY OF MIDDLESEX, ENGLAND.

WEARING-SURFACE OF STEAM-ENGINES.

SPECIFICATION forming part of Letters Patent No. 244,292, dated July 12, 1881.

Application filed October 21, 1880. (No model.) Patented in England December 18, 1872, and December 23, 1879.

*To all whom it may concern:*

Be it known that I, LOFTUS PERKINS, a subject of the Queen of Great Britain, residing at Seaford Street, in the county of Middlesex, England, have invented certain new and useful improvements in internal wearing or rubbing surfaces of steam-engines working in the presence and under direct pressure of steam, (for which I have received Letters Patent in England, No. 3,845, dated December 18, 1872, and No. 5,243, dated December 23, 1879,) of which the following is a specification.

In accordance with my invention and as in my earlier English patent above mentioned, packing-rings for the pistons of steam-engines and other such like internal wearing or rubbing surfaces exposed to the action of steam are made of a hard metal composed of five (5) parts of tin to sixteen (16) parts of copper. Packing-rings and other rubbing-surfaces, such as the wearing-surfaces of slide-valves, formed of this metal I found to work admirably without any lubrication in contact with steam, and to be particularly adapted for use in steam-engines working at very high pressure—say three hundred to five hundred pounds to the inch—where wearing-surfaces as ordinarily composed cannot be effectually protected by lubricant, and without such protection wear rapidly. As at first made, or as produced in accordance with my said invention patented in 1872 in England, the wearing-surfaces were costly, owing to the extremely hard and brittle nature of the metal, rendering it difficult to bring it to shape by planing or turning. Subsequently, and in accordance with my invention as in my later English patent above referred to, I produced the wearing or rubbing surfaces of the said composition perfectly and economically by heating the composition to a red heat and suddenly cooling it, as by plunging it into cold water or oil, thereby softening it, and then turning or planing it. When so softened the metal can be dressed or shaped as readily as ordinary gun-metal, and I have found the packing-rings or other wearing-surfaces of the soft metal work in contact with steam equally as well and without any lubrication as wearing or rubbing surfaces formed from the composition in its hard and brittle state. The metal, after having been softened and shaped, may be hardened by heating it and allowing it to cool slowly, and this without warping or changing the shape or dimension of the wearing-surface. In this way, when hard wearing-surfaces are desired, they may quickly and economically be produced.

Figure 2:
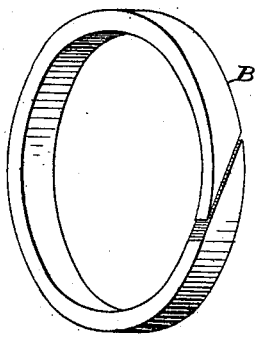

In the accompanying drawings, Figure 1 is a sectional view representing a piston, A, of a steam-cylinder having a packing-ring, B, made in accordance with my invention fitted to it; and Fig. 2 is a view in perspective of one of the common forms of piston packing-rings B, which may be beneficially made of the alloy herein specified.

In carrying out my invention as perfected the wearing-surface, whether it be a packing-ring or other form of internal wearing-surface for steam-engines, is first cast approximately to the form desired from a mixture of about five parts tin to sixteen parts copper. The copper and tin are melted separately. The tin is then put into the melted copper and thoroughly stirred, and the mixture at once poured into the mold. Either a sand or metal mold may be used. The packing-ring or other wearing-surface so cast approximately to form is, when removed from the mold, heated to a temperature such that it appears luminous, not more than blood-red in the dark, and is then suddenly and altogether plunged into cold water. When cool the packing-ring or other wearing-surface can, in its now softened state, be turned or planed to the required form, and can afterward be used in this softened state as a packing-ring or wearing-surface. I can, however, and sometimes do, again bring the metal back to its original hard condition before using it. The packing-ring or wearing-surface is for this purpose again heated to such an extent as to be luminous, not more than blood-red in the dark, and is then allowed to cool slowly in the air.

I do not claim the before-described alloy or composition consisting of five parts tin to sixteen parts copper, as I am aware that approximately the same composition was used prior to my invention. Neither do I claim, broadly, or regardless of the composition of which it is made, an anti-friction or self-lubricating internal wearing-surface for steam-engines; but I do claim as of my own invention—

1. The before-described steam-contact packing-ring or equivalent internal wearing or rubbing surface for steam-engines, formed of a composition of tin and copper in the proportions hereinbefore set forth, and requiring no lubrication in contact with steam.

2. The before-described improved steam-contact packing-ring or internal wearing-surface for steam-engines, requiring no lubrication in contact with steam, formed of an alloy composed of about five parts tin to sixteen parts copper, and in the production of which the composition is cast approximately to the shape desired, softened by suddenly cooling it, and turned or planed to the form required, as set forth.

3. As an improvement in the internal or steam-contact wearing-surfaces of engines, made of an alloy composed of about five parts tin to sixteen parts copper, and requiring no lubrication, casting such an alloy approximately to the form of wearing-surface required, then softening such casting by heating and suddenly cooling, turning or planing it to the proper shape, and finally hardening it by heating and gradually cooling, substantially as hereinbefore set forth.

LOFTUS PERKINS.

Witnesses:
W. W. HARRIS,
9 *Alexandra Villas, Hornsey Park.*
JOHN DEAN,
17 *Gracechurch Street, London, E. C.*